US009846254B2

(12) United States Patent
Kiasper et al.

(10) Patent No.: US 9,846,254 B2
(45) Date of Patent: Dec. 19, 2017

(54) METHOD FOR MARINE ELECTRIC SURVEY OF OIL-GAS DEPOSITS AND APPARATUS FOR CARRYING OUT THEREOF

(71) Applicants: Vladimir Kiasper, Saint Petersburg (RU); Evgeny Lisitsyn, Saint Petersburg (RU); Alexander Petrov, Saint-Petersburg (RU); Andrey Tulupov, Moscow (RU)

(72) Inventors: Vladimir Kiasper, Saint Petersburg (RU); Evgeny Lisitsyn, Saint Petersburg (RU); Alexander Petrov, Saint-Petersburg (RU); Andrey Tulupov, Moscow (RU)

(*) Notice: Subject to any disclaimer, the term of this patent is extended or adjusted under 35 U.S.C. 154(b) by 0 days.

(21) Appl. No.: 15/215,798

(22) Filed: Jul. 21, 2016

(65) Prior Publication Data
US 2017/0052271 A1    Feb. 23, 2017

(30) Foreign Application Priority Data
Aug. 17, 2015    (RU) ................... 2015134624

(51) Int. Cl.
| G01V 3/02 | (2006.01) |
| G01V 3/06 | (2006.01) |
| G01V 3/12 | (2006.01) |
| G01V 3/165 | (2006.01) |

(52) U.S. Cl.
CPC ............... *G01V 3/165* (2013.01); *G01V 3/06* (2013.01)

(58) Field of Classification Search
CPC .................. G01V 3/00; G01V 3/02
USPC .................................... 324/334, 365
See application file for complete search history.

(56) References Cited

U.S. PATENT DOCUMENTS

2012/0123683 A1* 5/2012 Loseth et al. ............ 702/6
2012/0161774 A1* 6/2012 Strack et al. ............ 324/332

\* cited by examiner

*Primary Examiner* — Bot Ledynh
(74) *Attorney, Agent, or Firm* — Aleksandr Smushkovich

(57) ABSTRACT

A proposed marine electric survey apparatus complex includes a generator line exciting electric field, bottom stations on a sea bottom profile, receiving lines interconnecting the stations. Each receiving line has two measuring electrodes defining a symmetric main space separation equal to the receiving line's length. Two adjacent bottom stations define a pair of electrodes, each electrode is located opposite to the other electrode, providing for measuring the electric field in one point ensuring measurements continuity and uniformity. A proposed method particularly includes forming two uniform continuous networks for measurements with respectively the main space separations and small space separations, determining the generator's location, registering signals received on the electrodes, obtaining data in the frequency and time domains for distance and vertical soundings, plotting a graph of the profile's resistivity along the profile's length, and according to correlations of induced polarization anomalies and resistivity, judging on the presence of hydrocarbon deposits.

5 Claims, 4 Drawing Sheets

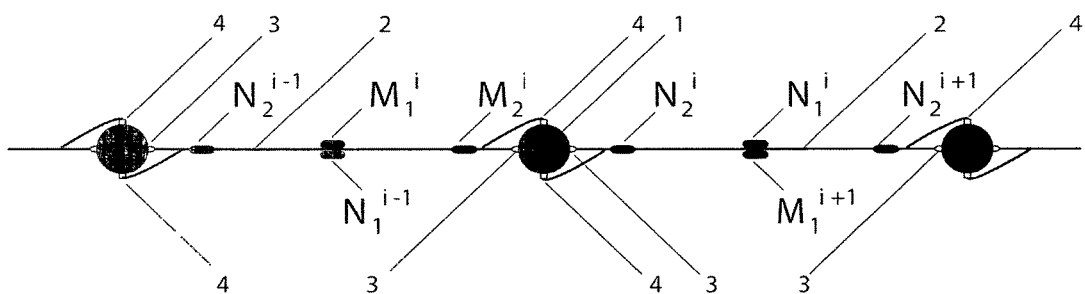

Fig.1

| Edge section | Gas-saturated section | Oil-saturated section |
|---|---|---|
| 10m Seawater $\rho=0.3\Omega m$ | 10m Seawater $\rho=0.3\Omega m$ | 10m Seawater $\rho=0.3\Omega m$ |
| 100m Sediments $\rho=1\Omega m, \eta=0.01, \tau=0.05s$ | 100m Hydrocarbon-induced altered sediments $\rho=1\Omega m, \eta=0.05, \tau=0.005s$ | 100m Hydrocarbon-induced altered sediments $\rho=1\Omega m, \eta=0.05, \tau=0.5s$ |
| 5000m Sediments $\rho=5\Omega m$ | 2000m Sediments $\rho=5\Omega m$ | 2000m Sediments $\rho=5\Omega m$ |
|  | 50m Reservoir $\rho=50\Omega m$ | 50m Reservoir $\rho=50\Omega m$ |
|  | 2950m Sediments $\rho=5\Omega m$ | 2950m Sediments $\rho=5\Omega m$ |
| Basement $\rho=200\Omega m$ | Basement $\rho=200\Omega m$ | Basement $\rho=200\Omega m$ |

Fig.2

METHOD FOR MARINE ELECTRIC SURVEY OF OIL-GAS DEPOSITS AND APPARATUS FOR CARRYING OUT THEREOF

CROSS-REFERENCES TO RELATED APPLICATIONS

This application claims priority under 35 U.S.C. 119 (a) through (d) under the Paris Convention from a Russian Federation patent application RU2015134624 filed 17 Aug. 2015 hereby entirely incorporated by reference.

FIELD OF THE INVENTION

The claimed invention relates to survey geophysics, in particular, to equipment providing geo-electric survey by employing measurement methods of induced polarization and resistivity, and it is intended for making prognosis for presence of carbohydrate deposits preferably in a transit shelf zone, as well as in areas having sea depths from 0 to 0-200 meters.

BACKGROUND OF THE INVENTION

Nowadays, different methods for marine survey of carbohydrate deposits are widely used. These methods are typically associated with:—influence of electromagnetic field pulses upon sea bottom;—registration of changes of electromagnetic parameters of near-bottom strata; and— analysis of obtained data for detection of existing anomalies and determination of their nature (RU 2236028, 2004; SU 1122998, 1984; SU 1798666, 1996; SU 1434385, 1988; U.S. Pat. Nos. 4,298,840, 1981; 4,617,518, 1986). Such methods are carried out with the help of different apparatus research complexes.

The most universal and prospective method for sea bottom survey utilizing vessels is the method of induced polarization (IP) (RU 2236028; RU 2253881, SU 1798666; SU 1434385; U.S. Pat. Nos. 4,298,840; 4,617,518), that allows taking into account both conductivity and chargeability of a sea bottom section during plotting the section profile.

There are known methods and apparatus described in RU2236028 and RU 2253881, in which the environment is electrically excited by a horizontal generator line towed behind a vessel, while primary and secondary signals are measured by a towed receiving line with the length from 500 up to 1000 meters.

This apparatus is practically inapplicable in shallow water conditions, since the vessel, which the complex is based upon, must be placed at a sufficient distance from the shore in a zone of significant depths. Moreover, obtaining profile data using such method is limited, as it provides only two variants: the excitation of environment at a fixed distance symmetrically in reference to a sounding point (i.e. a point of generation of probe signals), or immediately in the sounding point using two measuring stations. For example, the research complex of RU 2236028 uses unipolar current pulses and the generator dipole is located along the axis of a measurement line.

There is known a research complex (RC) described in RU0048645 including a vessel carrying a generator and a block of excitation field formation (BFF) that allows generating pulses in a discrete mode, a measuring apparatus, and auxiliary devices.

According to RU0048645, the BFF is connected with a vertical dipole having generator electrodes immersed into water, wherein the lower end of the dipole is located at a distance no more than 100 meters from the sea bottom. For registration of the signals, a set of bottom stations (BS) is used, including typical electric or magnetic bottom stations with flexible rods serving for placement of receiving electrodes. The stations are located in such a way that at least three stations are positioned within an area of possible deposits, while some of the stations are positioned beyond that area.

According to RU0048645, the RC also includes: auxiliary devices, in particular, a block of self-emersion of the bottom stations; a non-irradiating dummy load device, ensuring dissipation of the generator's energy in intervals between the pulses and consisting of pairs of electric dipoles with different directions and equal moments; and equipment for determination of the vessel's location, of the sea depth, etc.

The measurement method comprises a step of synchronization of the BFF's and the bottom stations' clocks at the moment when the vessel comes to the point of profile beginning, before placement of the bottom stations. The bottom stations are placed along the measurement profile in predetermined points in such a way that no less than three bottom stations would be located in the area of possible deposits, and a part of stations would be located beyond its boundaries.

After the stations have been placed, the vessel moves to the point located at a distance no less than the sea depth from the profile beginning, the generator line is lowered vertically, in order to position the lower generator electrode at a distance no more than 100 meters from the sea bottom; then the BFF is started, which forms bipolar pulses with pauses, producing a polarizing effect on the sea bottom strata.

In the pauses, the non-irradiating dummy load device is connected to the vessel's generator to reduce a surge of electric current. The block of current measurement (BCM) executes the current measurement in the dipole with a discreteness determined by a program both during the pulses and in the pause between the pulses with fixation of time of the beginning and time of the end of each pulse. The bottom stations execute signal registration with the same discreteness that in the BFF both during the pulses and in the pause between the pulses. Based on obtained data characterizing both conductivity and chargeability of the sea bottom strata, the profile sections are built, on the base of which a conclusion on presence or absence of oil-gas deposits is made.

The disadvantage of this solution was its inapplicability for shelf transit zones because of the necessity of using the vertical generator line with a length from several tens up to several hundred meters, which is practically impossible in case of sea depths not exceeding 10 meters.

The closest to the claimed invention are a method and an apparatus complex for marine oil-gas survey described in RU2375728 earlier developed by the instant authors.

According to RU2375728, a small-sized vessel tows an electro-surveying array with a total length up to 2000 meters including a generator line and a receiving line. For the generator line having a length of 300-500 meters, bipolar current pulses separated by pauses therebetween are formed. The receiving line includes minimum three electrodes located along the line with an equal step that allows measuring a first potential difference and a second potential difference (analogues of spatial derivatives), both during a pulse of current and a pause between such pulses.

The aforesaid method is characterized in that the source of information on strata properties utilizes both: data on the strata's conductivity and the strata's polarization characteristics, in particular, calculated as continuous measurements of first potential differences and second potential differences of the electric field both during the passage of current pulses and in the pause therebetween in a wide spatial-time domain.

The aforesaid method envisages: towing the generator line behind the vessel on the sea surface; exciting the electric field by alternating-sign (bipolar) pulses of a rectangular form; registering time series of signals with the help of multi-channel bottom stations equipped with receiving lines including at least three electrodes located at a distance of 50-500 meters from one another; registering time series of the first potential differences and the second potential differences of the electric field between the electrodes both during the passage of current pulses and in the pause between the pulses; for interpretation of information on the electric field, using data obtained both during the current pulses and in the pause therebetween, in a wide spatial-time domain; and determining not only the environment resistance but also its polarization characteristics.

In general, the above described method is suitable for finding anomalies of induced polarization (IP). It ensures high work productivity. However, it has a number of essential disadvantages. For example, application of the electro-surveying array of a significant length doesn't allow executing measurements near the shore, and moreover in a land-sea transition zone. Furthermore, focusing on finding only IP anomalies results in drilling unprofitable or diluted deposits. This means that the aforementioned method does not provide a suitable precision of prognosis for presence of carbohydrate deposits in near shore areas and in a land-sea transition zone.

BRIEF DESCRIPTION OF THE INVENTION

Therefore, the technological problem to be solved is how to improve the precision of prognosis for presence of carbohydrate deposits under sea bottom. The aforementioned problem is solved by the present invention through a creation of technology capable of providing continuity of the measurements.

The proposed technology employs known approaches of distance and vertical soundings. As it is known, a distance sounding is a frequency domain sounding where information about resistivity structure is revealed from measurements of signals vs distance between a transmitter and a receiver (an offset). As it is known, a vertical electrical sounding (VES) (also known as Schlumberger Sounding) is the particular case of distance sounding with offset equal to zero. VES is made by changing the separation between current or receiving electrodes. VES is by far the most used method for geo-electric surveying. Physical basics of the processes can be found, for example, in Methods in Geochemistry and Geophysics. Volume 45, Pages 3-770 (2014) Principles of Electromagnetic Methods in Surface Geophysics, Edited by A. A. Kaufman, D. Alekseev and M. Oristaglio.

The proposed technology utilizes signal measurements in a frequency domain that allows for measuring amplitudes and phases of harmonic components of the electric field generated by a generator dipole line and registered by a receiving line (herein also called an 'electro-surveying line') of a bottom station, wherein the amplitudes depend upon a distance between the generator line and the receiving line.

The proposed technology also utilizes signal measurements in a time domain that allows for measuring amplitudes of a series of electric field pulses generated by the generator dipole line and registered by the receiving line of a bottom station located in a specific point of the profile being surveyed.

The proposed technology defines a big (herein also called 'main') symmetric space separation being a distance between two electrodes of a receiving line connected to one bottom station wherein the two electrodes are arranged symmetrically in relation to a vertical axis of the bottom station, and the big space separation is equal to the length of the receiving line. The big separation is mostly used for resistivity sounding of depths more than 500 m. Results of such measurements basically depend on the resistivity of sea bottom strata.

The proposed technology defines a small symmetric space separation being a distance between two electrodes of a receiving line connected to a bottom station, wherein the two electrodes are arranged symmetrically in relation to a vertical axis of the bottom station, and the length of small symmetric space separation is 10 times less than the length of the generator dipole line, but is at least 10 m. The small separation is mostly used for resistivity sounding of depths less than 500 m and for revealing induced polarization anomalies.

The inventive solution envisages employment of a plurality of bottom stations for measuring an electric field (electric potential difference) excited by a generator dipole line, each said bottom station includes at least one measurement channel; wherein the bottom stations are mechanically and electrically interconnected with one another by receiving lines (herein, also called 'electro-survey lines'), each said receiving line has a length of 500-1000 meters, each said receiving line is furnished with a number of non-polarizing measuring electrodes; the measuring electrodes are located on the receiving line in such a way that, for each said bottom station, the measuring electrodes make at least one main symmetric space separation in relation to a vertical axis of the bottom station, wherein the main space separation is equal to said length of the receiving line; and any two said bottom stations adjacent to each other define a pair of said measuring electrodes, wherein each of the electrodes of said pair is located on the receiving line opposite to the other electrode of said pair, thereby providing for measuring the electric field in one point by the two measuring electrodes of said pair, which ensures continuity and uniformity of measuring the electric field along the survey profile and allows for flexible processing of data obtained from the measurements during survey of a sea bottom profile. The claimed technology is called "Long Dipole EM".

Any of the above-described bottom stations may be expanded with an additional (e.g. second) measurement channel with a small symmetric space separation, wherein the small space separation has a size 10 times less than the length of the generator dipole line, but minimum 10 meters.

The proposed design ensures an optimal measurement scheme, since, during passage of the generator dipole line near and above a bottom station, at the small space separation; it provides for a sufficient resolution, in the frequency domain, on resistivity of an upper section of the survey profile, while, in the time domain, it provides a possibility for measuring signals with opposite polarity of transient electric field decay (i.e. electro-dynamic decay of the electric field measured at a tail phase of an electric pulse produced by the generator dipole line) due to effects of induced polarization (A. E. Vishnyakov, E. D. Lisitsyn, M. Yu. Yanevich. Technics and Methodic of Geophysical Investigations of the Ocean. Proceedings of the Ministry of Geology USSR, 1988, p. 125). Such effects are demonstrated in FIGS. 2-5.

The main separations form a continuous measurement profile; they can be summed up for each electric current pulse generated by the generator dipole line, forming measurement separations aliquot to the length of the receiving line.

The result of the claimed method is achieved through the following steps:

- comparing clocks installed on the generator dipole line having a generator length, and on the bottom stations furnished with and connected by receiving lines each having a receiving length, wherein the receiving lines each has at least a pair of measuring electrodes;
- placement of the bottom stations on the sea bottom, thereby forming by the receiving lines—a uniform continuous network for measurements with main symmetric space separations equal to the length of the receiving line, and—a uniform network for measurements with small symmetric space separations, wherein each said space separation has a length at least 10 times less than the generator line's length;
- towing the generator line behind the vessel on the sea surface;
- exciting an electric field by the generator line using alternating-sign electric current pulses of a rectangular shape with a pause therebetween and with a duration and an on-off time ratio determined by computer software, thereby carrying out distance and vertical soundings of the survey profile;
- determining locations of the generator line with the help of buoys furnished with receivers of signals of a satellite navigation system;
- for each of said locations, registering signals received on said pairs of the measuring electrodes both during the electric current pulses and in the pause therebetween, in the frequency domain and in the time domain;
- identifying the profile's regions wherein the signals of said pairs of the receiving electrodes change polarity in the tail phase of said transient field decay, and marking these regions;
- according to changes of said profile regions with the opposite signs, along the profile, identifying induced polarization anomalies;
- according to data obtained from the signals in the frequency domain and in the time domain, for the distance and vertical soundings, plotting a section graph of changing the resistivity along the profile's length; and
- according to correlations of the induced polarization anomalies and the resistivity, judging on the presence of hydrocarbon deposits within the surveyed profile.

The continuity of the measurement network based on the main symmetric separations, for any location of the generator line, symmetric in relation to any bottom station, determined by the satellite system, allows, for this bottom station, building a system for measurement of the electric field by using a number of the receiving lines adjacent to each other (herein called a 'symmetric array') and symmetrically arranged in relation to the vertical axis of the bottom station, wherein the number of the receiving lines (and correspondingly their total length) in the symmetric array can be sequentially increased (or reduced), if needed.

Any of the receiving lines has a geometric center. The receiving line defines a section, having a section length, and a section center coincides with the geometric center of receiving line. If the section has a length equal to a third of the length of receiving line, such section is herein called a 'middle third' of the receiving line.

Taking into account the reciprocity principle, the electric field excited in the middle third of receiving line does not practically change. Therefore, if the generator dipole line moves in an interval equidistant from the middle third of receiving line, and if the interval's length is equal the middle third's length, the generated signals may be summed up for noise suppression. That is especially important for main space separations to increase the resolution for great survey depths.

BRIEF DESCRIPTION OF DRAWINGS OF THE INVENTION

FIG. 1 schematically illustrates a marine electrical survey complex, according to a preferred embodiment of the present invention.

FIG. 2 schematically illustrates a model for environment beyond a deposit area, for a gas-saturated section, and for an oil-saturated section.

Figure 7:
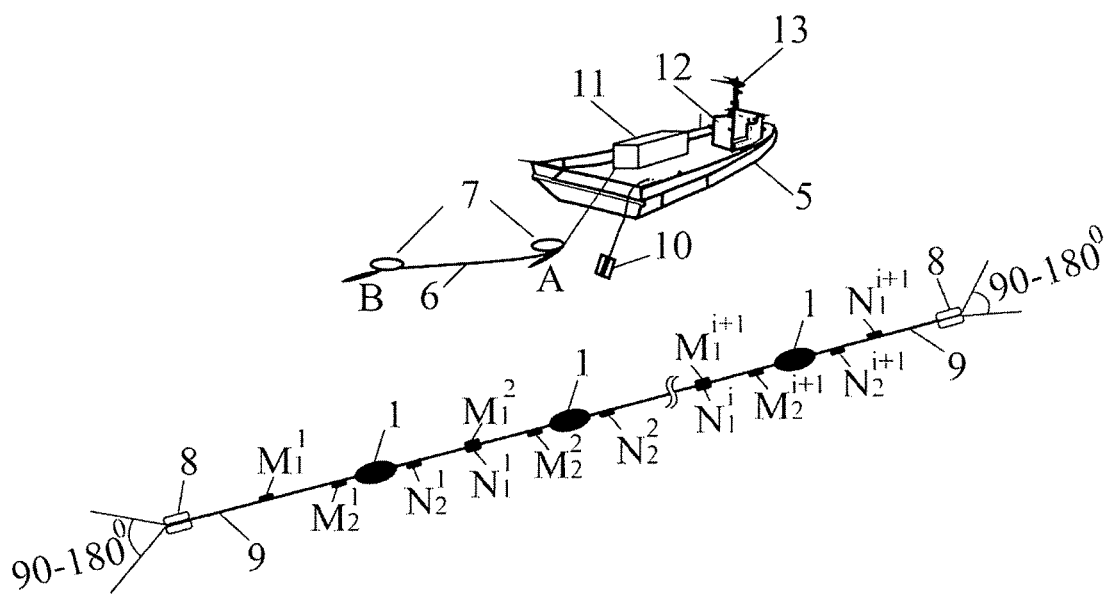

FIG. 7 schematically illustrates operation of the marine electrical survey complex, according to a preferred embodiment of the present invention.

DETAIL DESCRIPTION OF EMBODIMENTS OF THE PRESENT INVENTION

While the invention may be susceptible to embodiment in different forms, there are described in detail herein below, specific embodiments of the present invention, with the understanding that the instant disclosure is to be considered an exemplification of the principles of the invention, and is not intended to limit the invention to that as described herein.

FIG. 1 is a schematic representation of the inventive marine electrical survey complex, wherein the following numerals refer to: 1—a bottom station supplied with its own clock (not shown); 2—a receiving line (herein also called 'electro-surveying line') having a receiving line's length; 3—mechanical attachment points, wherein any of the bottom stations 1 is coupled to the respective receiving line 2; 4—electrical power hermetic connectors electrically connecting the bottom station 1 with the respective receiving line 2; $M^i_1 N^i_1$—a pair of measuring electrodes (big space separation) capable of measuring electrical potentials, the pair has a length equal to the receiving line's length; $M^i_2 N^i_2$—a pair of measuring electrodes (small space separation) capable of measuring electrical potentials, the pair has a length equal to 1/10 of the length of the generator dipole line 6 (shown in FIG. 6), but minimum 10 meters.

FIGS. 2-5 present results of mathematical modeling of an electric signal beyond and above the oil or gas deposits measured by a symmetric array arranged as described above.

Figure 3:
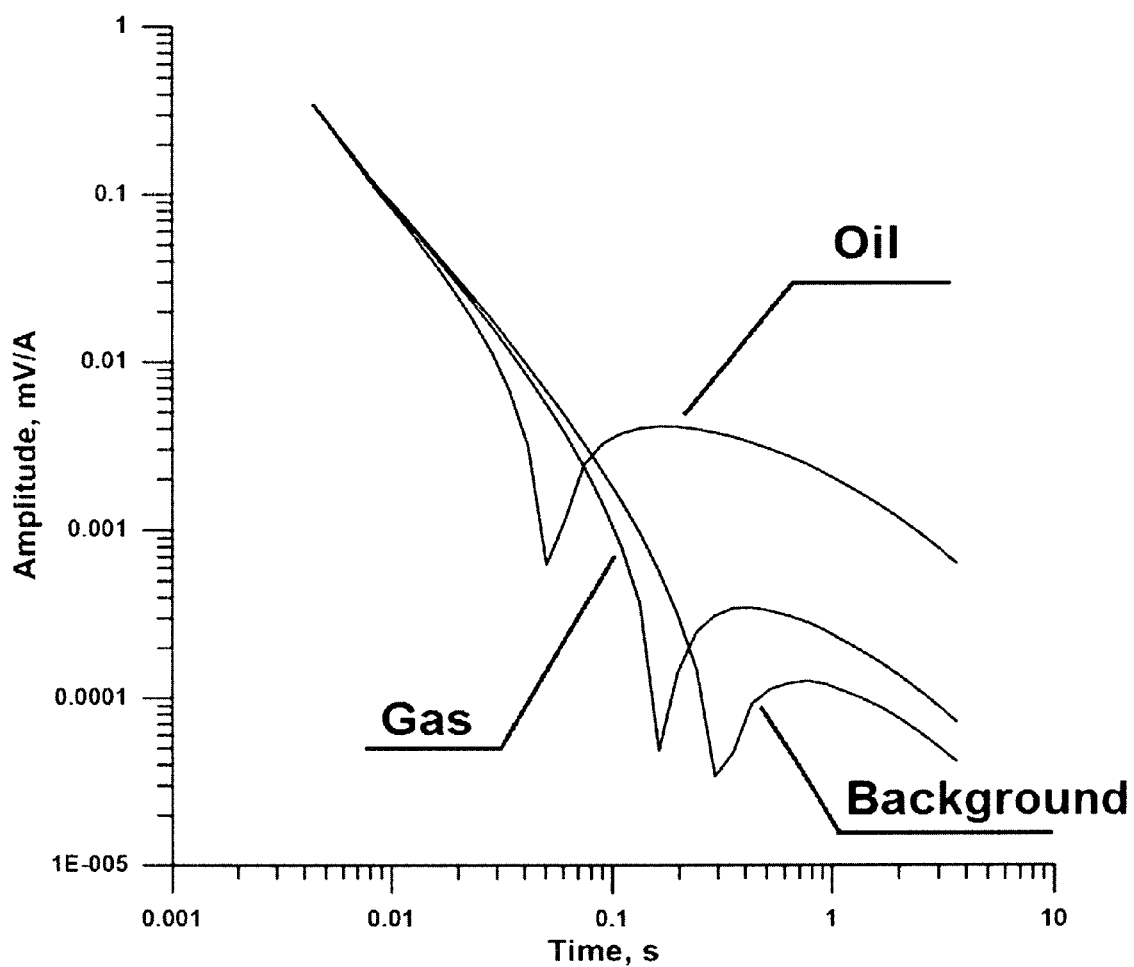
FIG. 3 shows a graph of time dependency of transient electric field decay signals, measured by a symmetric array for different section types.
Figure 4:
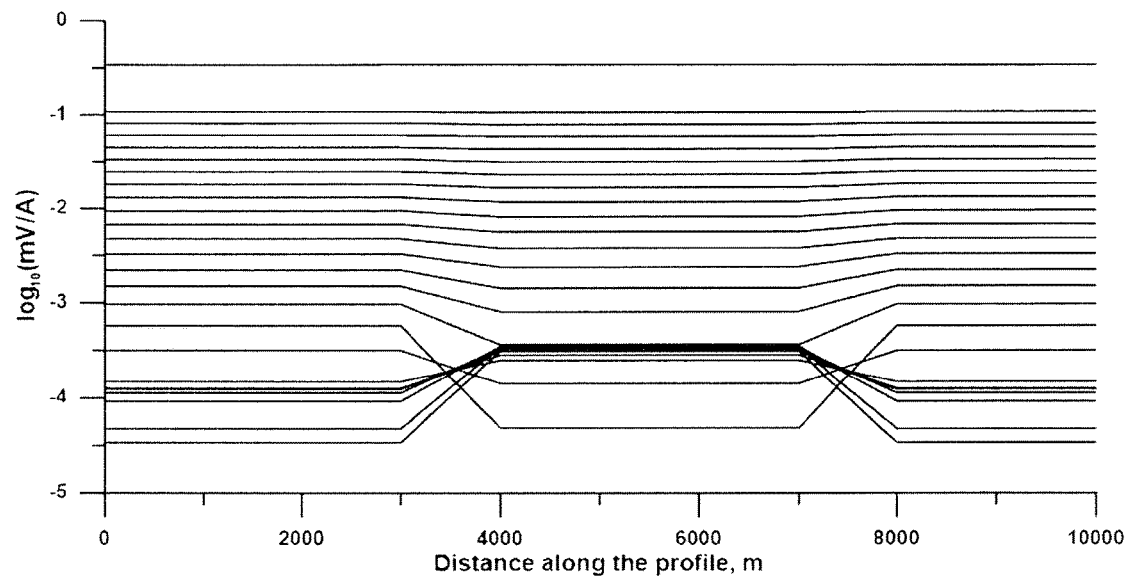
FIG. 4 shows a graph of profiling of an electric signal along a theoretical line for different delays (isochrones) for a gas-saturated model.
Figure 5:
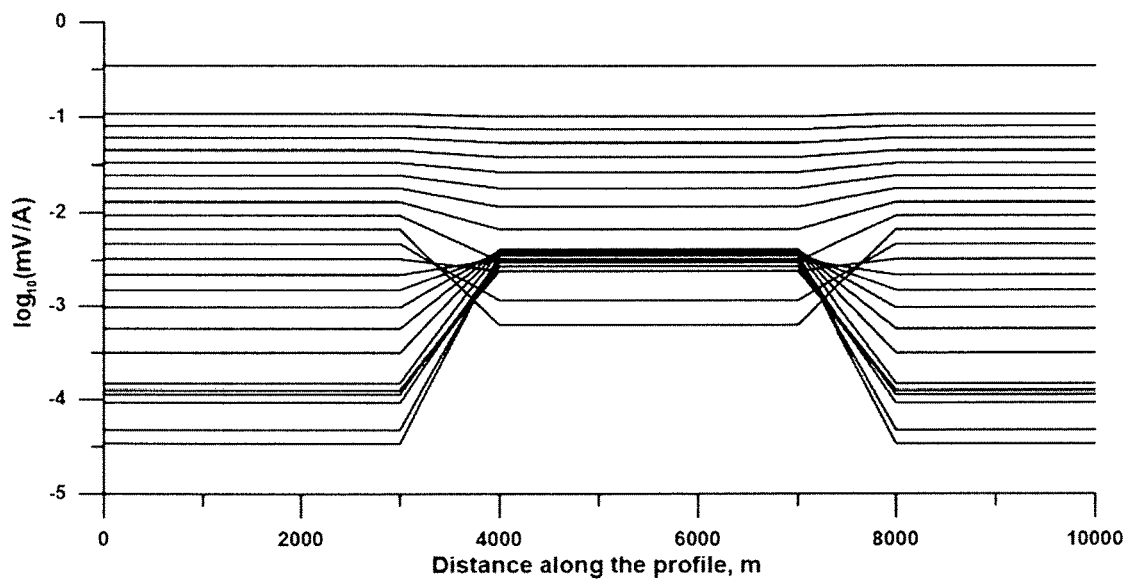
FIG. 5 shows a graph of profiling of an electric signal along a theoretical line for different delays (isochrones) for the oil-saturated model.
Figure 6:
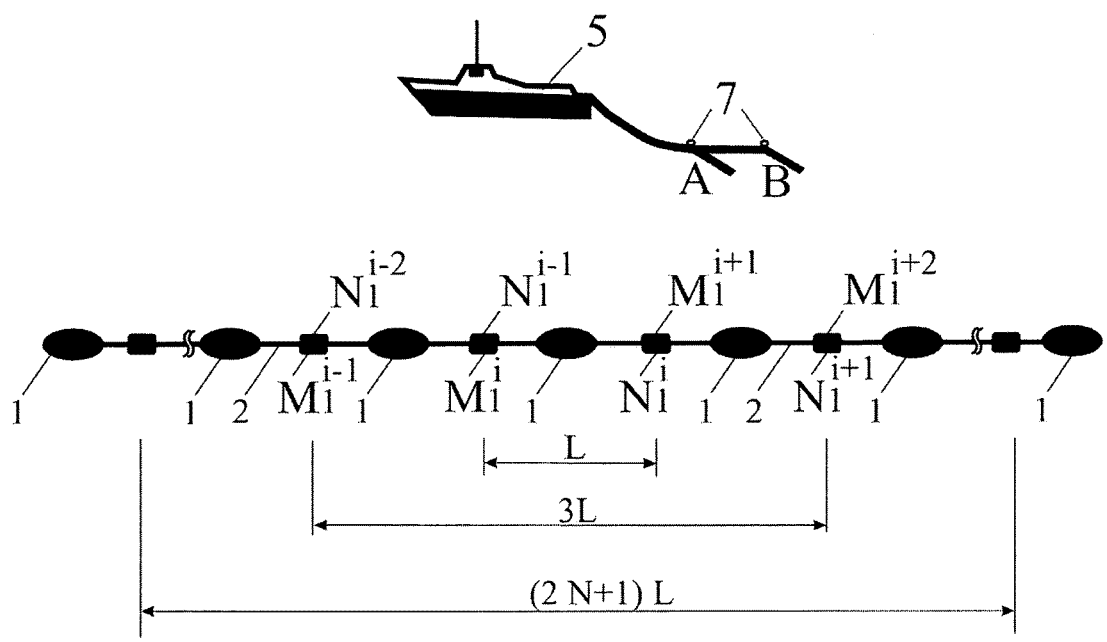
FIG. 6 shows a scheme of rebuilding the measuring array into an array of vertical electric sounding.

In FIG. 6, the following numerals refer to: 5—a small-sized generator vessel; 6—a generator dipole line with electrodes A and B; 7—buoys with receivers of a satellite navigation system for determination of the electrodes' coordinates. FIG. 6 also illustrates a symmetric array $M^i_1 N^i_1$ including one bottom station 1 and one pair of electrodes (defining a main space separation), and having a length of the receiving line L; and a symmetric array $M^{i-1}_1 N^{i-1}_1$ including three bottom stations 1 and two pairs of electrodes and having a length of three receiving lines 3L. A wider symmetric array having a length of $(2N+1)*L$, as shown in FIG. 6, can also be utilized. The wider symmetric arrays are mostly used for sounding deep sections of the survey profile in the time domain.

FIG. 7 presents a scheme of operation of the inventive marine survey complex, which is described below.

Obtaining information on the sea bottom structure is executed as follows (FIG. 7). A survey profile is predetermined. A vessel-installer (not shown) arrives at a predetermined point of the profile at a distance equal to the length of the receiving line from the profile's beginning, and starts installation of the bottom stations by throwing down a self-emerging (pop-up) buoy 8 coupled with a load attached to an unfastening halyard 9 associated with a buoy release mechanism connected with an acoustic antenna (herein also collectively called an 'acoustic channel'). The halyard 9 has negative floatability and is coupled with the first bottom station 1 through the first receiving line. A directional diagram of the acoustic antenna has an angular width of 90-180 degrees and is directed horizontally and outwardly in relation to the profile's direction.

During the movement of the vessel-installer along the profile, a sequential discharge of the unfastening halyard 9 coupled with the receiving lines coupled with the bottom stations 1 is carried out. The points where the bottom stations are thrown (i.e. installed on the sea bottom) are marked with the help of the satellite navigation system. At the end of installations of the bottom stations 1, analogously to the beginning of installation, the self-emerging buoy 8 (similarly attached to another unfastening halyard 9 associated with another buoy release mechanism connected with another acoustic antenna having a similar directional diagram directed horizontally and outwardly in relation to the profile's direction) is thrown.

After the installation of the bottom stations 1 is completed, a generator vessel 5 arrives at a prescribed point of the survey profile. The generator vessel 5 is equipped with a diesel-generator 11 and a block of current pulses formation 12, and a component of a satellite navigation system 13, including a clock. The generator vessel 5 tows a generator dipole line 6 and a non-radiating electrical dummy load 10.

During the movement of the vessel 5 along the survey profile, the block 12 forms bipolar electric current pulses with pauses therebetween, which current pulses run through the generator dipole line 6. The beginnings and the ends of the current pulses and their duration are controlled with the clock of the satellite navigation system 13, synchronized with the clocks of the bottom stations 1.

During the pauses between the current pulses the diesel-generator 11 is electrically loaded on the dummy load 10.

After the completion of the profile survey, the vessel-installer sends a command via the acoustic channel for emersion of the self-emerging buoy 8, and then the unfastening halyard 9, the receiving lines, and the bottom stations 1 are lifted onboard of the vessel-installer.

Thereafter, depending on the weather conditions, the bottom stations can be positioned on other profiles prescribed for survey, or obtained survey data can be downloaded from the bottom stations for quality evaluation and subsequent processing and interpretation thereof.

During the data processing in the time domain, zones of anomalous IP signals are identified. During the data processing in the frequency domain, profile regions with increased values of apparent resistivity of the target horizontal level are identified.

Correlation of such identified IP and resistivity anomalies allows for evaluation of perspective of the survey area, even on the operating stage, and for making administrative decisions on changing and detailing the survey network.

We claim:

1. An apparatus complex for marine electric survey of a sea bottom profile, usable for making prognosis on presence of carbohydrate deposits under the sea bottom profile;

said apparatus complex comprising:

a generator dipole line exciting an electric field;

a plurality of bottom stations installed on the sea bottom profile, said bottom stations receive and store data obtained from said marine electric survey; each said bottom station is provided with at least one measurement channel;

a plurality of receiving lines measuring the electric field; the receiving lines mechanically and electrically interconnect said bottom stations; each said receiving line has a length; each said receiving line is furnished with at least two non-polarizing measuring electrodes associated with said at least one measurement channel; the measuring electrodes are located on the respective receiving line such that, for the respective bottom station, the measuring electrodes define a main space separation being symmetrical in relation to a vertical axis of the bottom station, wherein the main space separation is equal to said length of the receiving line; and wherein: any two said bottom stations adjacent to each other define a pair of said measuring electrodes each pertaining to the corresponding receiving line of one of the two adjacent bottom stations; each of the electrodes of said pair is located on the corresponding receiving line opposite to the other electrode of the other receiving line of the other bottom station, providing for measurement of the electric field essentially in one spatial point by the two measuring electrodes of said pair, thereby ensuring continuity and uniformity of measuring the electric field along the sea bottom profile, which allows for flexible processing said data obtained from the marine electric survey.

2. The apparatus complex according to claim 1, wherein: said generator dipole line has a dipole length;

said bottom stations each is further provided with an additional measurement channel;

each said receiving line is further furnished with two non-polarizing additional measuring electrodes associated with said additional measurement channel; the additional measuring electrodes are located on the respective receiving line such that, for the respective bottom station, the additional measuring electrodes define a small space separation being symmetric in relation to said vertical axis of the bottom station; and wherein the small space separation is equal to one tenth of said dipole length, but is at least 10 meters long.

3. The apparatus complex according to claim 1, wherein said length of the receiving line ranges from 500 to 1000 meters.

4. A method for marine electric survey employing the apparatus complex according to claim 2, said method comprising the steps of:
- synchronizing clocks installed on the generator dipole line, and on the bottom stations;
- placement of the bottom stations on the sea bottom profile, thereby forming by the receiving lines
  - a uniform continuous network for measurements with the main space separations, and
  - a uniform continuous network for measurements with the small space separations;
- towing the generator dipole line by a generator vessel along the sea bottom profile;
- exciting the electric field by said generator dipole line using alternating-sign electric current pulses of a rectangular shape with a pause therebetween and with a duration and an on-off time ratio predetermined by computer software essentially controlling operation of said generator dipole line, thereby carrying out distance and vertical soundings of the sea bottom profile;
- determining locations of the generator dipole line with the help of buoys furnished with receivers of navigation signals of a satellite navigation system;
- for each of said locations of the generator dipole line, registering electric field signals received on said pairs of the measuring electrodes both during the electric current pulses and in the pause therebetween, in a frequency domain and in a time domain;
- identifying regions of the profile wherein said electric field signals change polarity in a tail phase of transient field decay, and marking said regions;
- according to changes of polarity of the electric field signals in said regions, along the sea bottom profile, identifying induced polarization anomalies;
- according to data obtained from the electric field signals in the frequency domain and in the time domain, for the distance and vertical soundings, plotting a section graph of changing resistivity of the sea bottom profile along the profile's length; and
- according to correlations of the induced polarization anomalies and said resistivity of the sea bottom profile, judging on the presence of hydrocarbon deposits within the sea bottom profile.

5. The method according to claim 4, wherein:
- each said receiving line defines a geometric center thereof, and a middle section thereof having a middle section center and a middle section length equal to one third of the length of said receiving line, wherein the middle section center is coincided with said geometric center;
- the generator dipole line is towed in an interval equidistant from said middle section, and the interval's length is equal to the middle section length;
- the generator dipole line generates signals of the electric field; and
- said method further comprises the step of:
  - summing up the signals of said electric field for noise suppression to enhance survey of great depths of the sea bottom profile.

* * * * *